(12) United States Patent
Nakaiwa

(10) Patent No.: US 11,019,224 B2
(45) Date of Patent: May 25, 2021

(54) IMAGE FORMING APPARATUS FOR FORMING IMAGE ON RECORDING SHEET

(71) Applicant: KYOCERA Document Solutions Inc., Osaka (JP)

(72) Inventor: Yuki Nakaiwa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/854,359

(22) Filed: Apr. 21, 2020

(65) Prior Publication Data

US 2020/0344361 A1    Oct. 29, 2020

(30) Foreign Application Priority Data

Apr. 26, 2019  (JP) .............................. JP2019-086209

(51) Int. Cl.
*H04N 1/00*  (2006.01)
*G06F 3/12*  (2006.01)
*G06K 15/02*  (2006.01)

(52) U.S. Cl.
CPC ..... *H04N 1/00037* (2013.01); *H04N 1/00029* (2013.01); *H04N 1/00334* (2013.01)

(58) Field of Classification Search
None
See application file for complete search history.

(56) References Cited

U.S. PATENT DOCUMENTS

| 8,130,407 | B2 * | 3/2012 | Nose ...................... G06K 1/121 |
| | | | 358/1.18 |
| 9,292,611 | B1 * | 3/2016 | Gysin .............. G06K 19/06037 |
| 2002/0133755 | A1 * | 9/2002 | Lopke ................. G06F 11/0769 |
| | | | 714/43 |
| 2012/0304089 | A1 * | 11/2012 | Cohen ................. G06F 11/0766 |
| | | | 715/764 |
| 2013/0077117 | A1 * | 3/2013 | Kobayashi ......... H04N 1/00408 |
| | | | 358/1.13 |
| 2013/0114100 | A1 * | 5/2013 | Torii .................. H04N 1/00344 |
| | | | 358/1.14 |

(Continued)

FOREIGN PATENT DOCUMENTS

| JP | 3900175 | B2 | 4/2007 | |
| JP | 2008093966 | * | 4/2008 | .............. B41J 2/175 |
| JP | 5298984 | B2 | 9/2013 | |

*Primary Examiner* — Beniyam Menberu
(74) *Attorney, Agent, or Firm* — IP Business Solutions, LLC

(57) ABSTRACT

An image forming apparatus includes a display and a control device. The control device functions as: a detector detecting a trouble occurred in an own apparatus; and a controller. The controller performs, with respect to a trouble-displaying image including a two-dimensional code in which a storage location on a network is converted into an image, at least one of three outputs of displaying on the display, printing on a recording sheet, and transmitting to an external apparatus. The storage location is where information indicating a method for dealing with the trouble detected by the detector is stored. Based on a predetermined first degree using at least either difficulty in solving the trouble or seriousness of the trouble as an indicator, the controller changes a size of the two-dimensional code corresponding to the trouble so as to be larger as the first degree becomes higher, and then outputs the two-dimensional code.

3 Claims, 21 Drawing Sheets

(56) References Cited

U.S. PATENT DOCUMENTS

| | | | | |
|---|---|---|---|---|
| 2014/0025992 A1* | 1/2014 | DeRoos | ............. | G06F 11/0793 |
| | | | | 714/25 |
| 2014/0103122 A1* | 4/2014 | Lundell | ........... | G06K 19/06112 |
| | | | | 235/494 |
| 2020/0344380 A1* | 10/2020 | Nakaiwa | ........... | H04N 1/00037 |

* cited by examiner

| TROUBLE CODE | QR CODE | MESSAGE | OCCURRENCE LOCATION | DEGREE OF DIFFICULTY |
|---|---|---|---|---|
| ER001-123 | | MALFUNCTION HAS OCCURRED | IMAGE FORMING DEVICE | 3 |
| ER002-456 | | PAPER IS JAMMED | THIRD TRAY OF PAPER FEED CASSETTES | 2 |
| ER002-521 | | SLIT GLASS IS CONTAMINATED | IMAGE READING DEVICE | 1 |
| ER003-777 | | UNIT NEEDS TO BE CHANGED | IMAGE FORMING DEVICE | 2 |

Fig.6

| DEGREE OF DIFFICULTY | DISPLAY SIZE |
|---|---|
| 3 | 125% OF REFERENCE SIZE |
| 2 | 100% OF REFERENCE SIZE |
| 1 | 75% OF REFERENCE SIZE |

| DEGREE OF DIFFICULTY | DISPLAY COLOR |
|---|---|
| 3 | RED |
| 2 | YELLOW |
| 1 | BLACK |

114

112

| TROUBLE CODE | QR CODE | MESSAGE | OCCURRENCE LOCATION | DEGREE OF DIFFICULTY | DEGREE OF DANGER |
|---|---|---|---|---|---|
| ER001-123 | ▦ | MALFUNCTION HAS OCCURRED | IMAGE FORMING DEVICE | 3 | 3 |
| ER002-456 | ▦ | PAPER IS JAMMED | THIRD TRAY OF PAPER FEED CASSETTES | 2 | 1 |
| ER002-521 | ▦ | SLIT GLASS IS CONTAMINATED | IMAGE READING DEVICE | 1 | 1 |
| ER003-777 | ▦ | UNIT NEEDS TO BE CHANGED | IMAGE FORMING DEVICE | 2 | 2 |

Fig.19

| DEGREE OF DANGER | DISPLAY COLOR |
|---|---|
| 3 | RED |
| 2 | YELLOW |
| 1 | BLACK |

115

IMAGE FORMING APPARATUS FOR FORMING IMAGE ON RECORDING SHEET

INCORPORATION BY REFERENCE

This application claims priority to Japanese Patent Application No. 2019-086209 filed on Apr. 26, 2019, the entire contents of which are incorporated by reference herein.

BACKGROUND

The present disclosure relates to an image forming apparatus and particularly relates to a technique of guiding how to deal with an occurred trouble.

In image forming apparatuses, such as a copying machine and printer, in some cases, when a trouble like a paper jam occurs, a message and/or a service code (identification code of the trouble) indicating how to deal with the occurred trouble are displayed on a display. In such image forming apparatuses, user makes access to a storage location on a network (uniform resource locator (URL)), where information indicating a method for dealing with the trouble is stored, by making reference to the message displayed on the display, or by searching the service code on a homepage of a company that manufactured the copying machine, for example. The user can thereby see the method for dealing with the trouble.

SUMMARY

A technique improved over the aforementioned technique is proposed as one aspect of the present disclosure.

An image forming apparatus according to one aspect of the present disclosure includes a display and a control device. The control device includes a processor and, through the processor executing a control program, functions as a detector and a controller. The detector detects a trouble occurred in an own apparatus. The controller performs, with respect to a trouble-displaying image including a two-dimensional code in which a storage location on a network is converted into an image, at least one of three outputs of displaying on the display, printing on a recording sheet, and transmitting to an external apparatus. The storage location is where information indicating a method for dealing with the trouble detected by the detector is stored. Based on a predetermined first degree using at least either difficulty in solving the trouble or seriousness of the trouble as an indicator, the controller changes a size of the two-dimensional code corresponding to the trouble so as to be larger as the first degree becomes higher, and then outputs the two-dimensional code.

BRIEF DESCRIPTION OF THE DRAWINGS

FIG. 2 is a diagram showing an example of a data configuration stored in a trouble information storage device.

FIG. 6 is a diagram showing an example of a size table.

FIG. 12 is a diagram showing an example of a display color table.

FIG. 19 is a diagram showing an example of the display color table.

DETAILED DESCRIPTION

Figure 1:
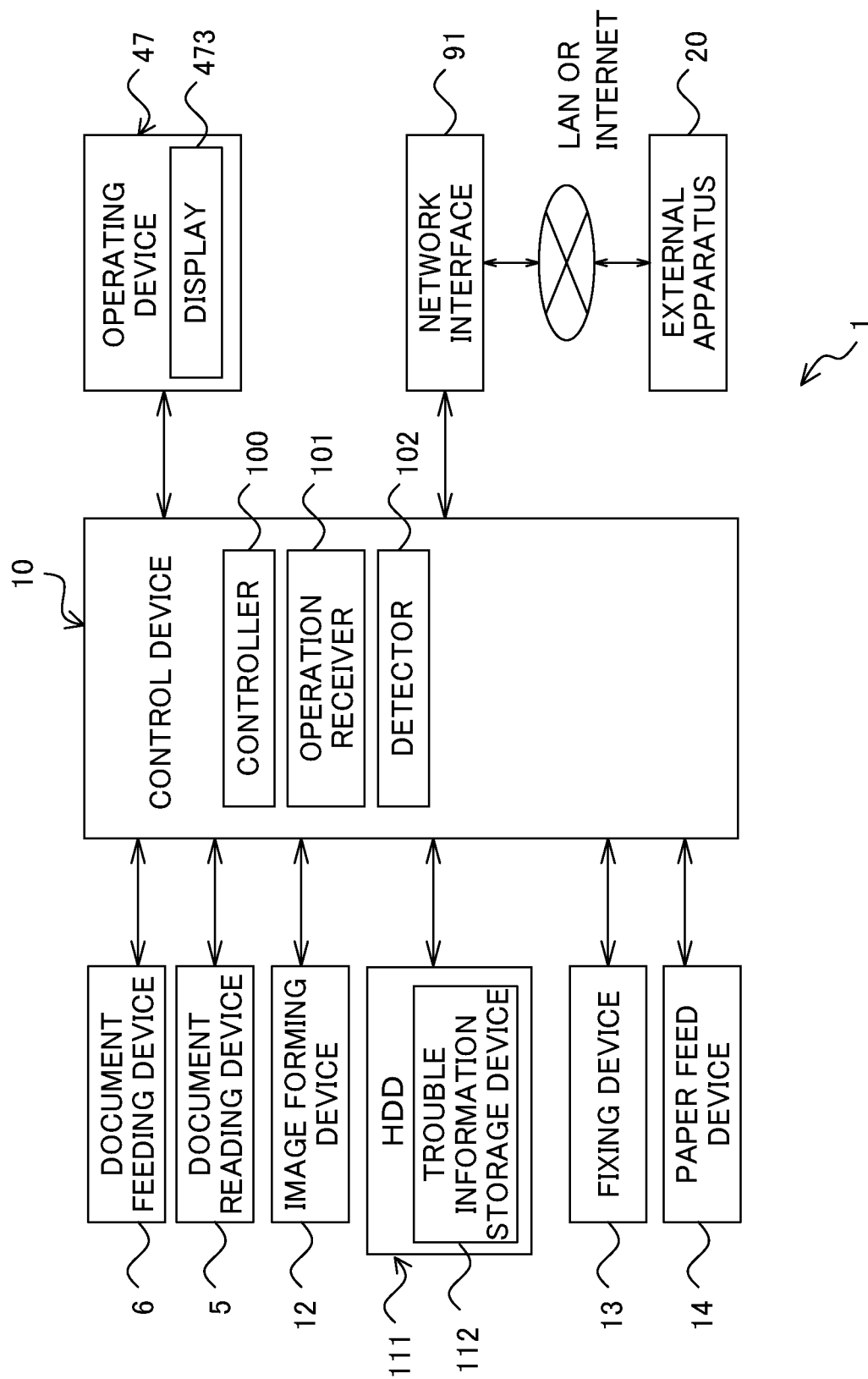
FIG. 1 is a functional block diagram schematically showing an essential part of an internal configuration of an image forming apparatus according to one embodiment of the present disclosure.

Hereinafter, a description will be given of an image forming apparatus according to one embodiment of the present disclosure with reference to the drawings. FIG. 1 is a functional block diagram schematically showing an essential part of an internal configuration of the image forming apparatus according to one embodiment of the present disclosure.

The image forming apparatus 1 according to the first embodiment is a multifunction peripheral having multiple functions such as a copy function, printing function, a scanning function, and a facsimile function. The image forming apparatus 1 includes a control device 10, a document feeding device 6, a document reading device 5, an image forming device 12, a hard disk drive (HDD) 111, a fixing device 13, a paper feed device 14, an operating device 47, and a network interface 91.

Hereunder, a case where a document reading operation is performed in the image forming apparatus 1 is described. The document reading device 5 optically reads an image of a document fed by the document feeding device 6 or of a document placed on a contact glass (not shown), and then generates image data. The image data generated by the document reading device 5 is stored in an un-illustrated image memory or the like.

Hereunder, a case where an image forming operation is performed in the image forming apparatus 1 is described. Based on the image data generated by the document reading operation or based on the image data received from the external apparatus 20 such as a personal computer connected via a network, the image forming device 12 forms a toner image on a recording sheet, being as a recording medium, fed from the paper feed device 14.

The HDD 111 is a large-capacity storage device including a trouble information storage device 112. The trouble information storage device 112 is, for example, formed in a partial area of the HDD 111. The trouble information storage device 112 stores information on a trouble occurred in the own apparatus and stores a size table 113 to be described later. The trouble information storage device 112 is created in the HDD 111 when a control program to be described later is installed.

FIG. 2 is a diagram showing an example of a data configuration with respect to the information on the trouble that the trouble information storage device 112 stores. The trouble information storage device 112 stores, for example, a QR code (registered trademark), message, trouble occurrence location, and predetermined degree of difficulty (that uses difficulty in solving the trouble as an indicator), in cross-reference with a trouble code (identification code of trouble). The QR code is a kind of a two-dimensional code in which a storage location on a network (for example a URL) is converted into an image. The storage location is where the information indicating a method for dealing with the trouble is stored. The degree of difficulty, for example, consists of three levels: "3" is the highest and "1" is the lowest.

The degree of difficulty is one example of the first degree in What is claimed is. Here, the degree of difficulty is described as using the difficulty in solving the trouble as an indicator, but seriousness of the trouble may be used as the indicator. Moreover, both the difficulty in solving the trouble and the seriousness of the trouble may be used as the indicator. Furthermore, the degree of difficulty may consist of two levels, or of four or more levels.

Also, it may be configured such that, instead of storing the QR code, the trouble information storage device 112 stores the storage location (URL) storing the information indicating the method for dealing with the trouble, and when necessary, the controller 100 creates a QR code from the URL.

The fixing device 13 applies heat and pressure to the recording sheet on which the toner image is formed by the image forming device 12 to thereby fix the toner image onto the recording sheet. The recording sheet that has undergone the fixing process is discharged to a discharge tray (not shown). The paper feed device 14 has paper feed cassettes.

The operating device 47 is an operation panel that receives instructions, such as an image forming operation execution instruction, from an operator, for operation and processing that the image forming apparatus 1 is capable of performing. The operating section 47 includes a display 473 for displaying operation guidance and so forth to the operator.

The display 473 is a display device such as a liquid crystal display device. A front surface of the display 473 is provided with a touch panel. That is, the display 473 has a touch panel function, and thus the operator can touch a button or a key displayed on the screen to operate the image forming apparatus 1.

The network interface 91 transmits and receives various kinds of data to and from the external apparatus 20 located within the local area or on the Internet.

The control device 10 is formed of a processor, a random access memory (RAM), a read only memory (ROM), and an exclusive hardware circuit. The processor is, for example, a central processing unit (CPU), an application specific integrated circuit (ASIC), or a micro processing unit (MPU). The control device 10 includes a controller 100, an operation receiver 101, and a detector 102.

The control device 10 functions as the controller 100, the operation receiver 101, and the detector 102, through operation by the processor according to a control program stored in the HDD 111. Here, the controller 100, the operation receiver 101, and the detector 102 may each be constituted in a form of a hardware circuit, instead of being operated according to the control program by the control device 10. This also applies to other embodiments, unless otherwise specifically noted.

The controller 100 collectively controls the image forming apparatus 1. The controller 100 is connected to the document feeding device 6, the document reading device 5, the image forming device 12, the HDD 111, the fixing device 13, the paper feed device 14, the operating device 47, and the network interface 91. The controller 100 performs driving controls of each of these components.

The operation receiver 101 receives, from the user through the operating device 47, input of operation. The operation receiver 101 receives instructions that are based on user operation performed on a hard key provided on the operating device 47, and furthermore, receives, by the touch panel function of the display 473, instructions that are based on user operation performed on an operation screen displayed on the display 473.

The detector 102 detects a trouble occurred in the own apparatus (i.e., the image forming apparatus 1). Examples of the troubles are a paper jam at a recording sheet transport path that connects from the paper feed device 14 to the unillustrated output tray, an abnormal stop due to malfunction of the image forming device 12, and so on. Based on signals from sensors provided in several parts of the operating mechanism of the image forming apparatus 1 and signal transmission and reception with each operating mechanism, the detector 102 detects a trouble having been occurred in the own apparatus using a known technique. The trouble information storage device 112 stores corresponding data in advance: in the corresponding data, troubles (such as malfunction of the image forming device 12, paper jam, contamination of slit glass, and change of a unit) detected by the detector 102 are respectively cross-referenced with trouble codes (such as ER001-123, ER002-456, ER002-521, and ER003-777, shown in FIG. 2).

Using the corresponding data of the trouble information storage device 112, the controller 100 identifies the trouble code indicating the trouble that the detector 102 detected. The controller 100 then reads out the QR code and the degree of difficulty corresponding to the trouble code indicating the trouble that the detector 102 detected from the trouble information storage device 112, and determines a size of the QR code and the message based on the degree of difficulty having been read out. Furthermore, the controller 100 adds an image representing the QR code and the message the sizes of which have been determined (hereinafter simply referred to as the QR code and message) on a base image B of a trouble-displaying image (see FIG. 3), and creates the trouble-displaying image. Then, the controller 100 causes the display 473 to display the created trouble-displaying image.

Figure 3:
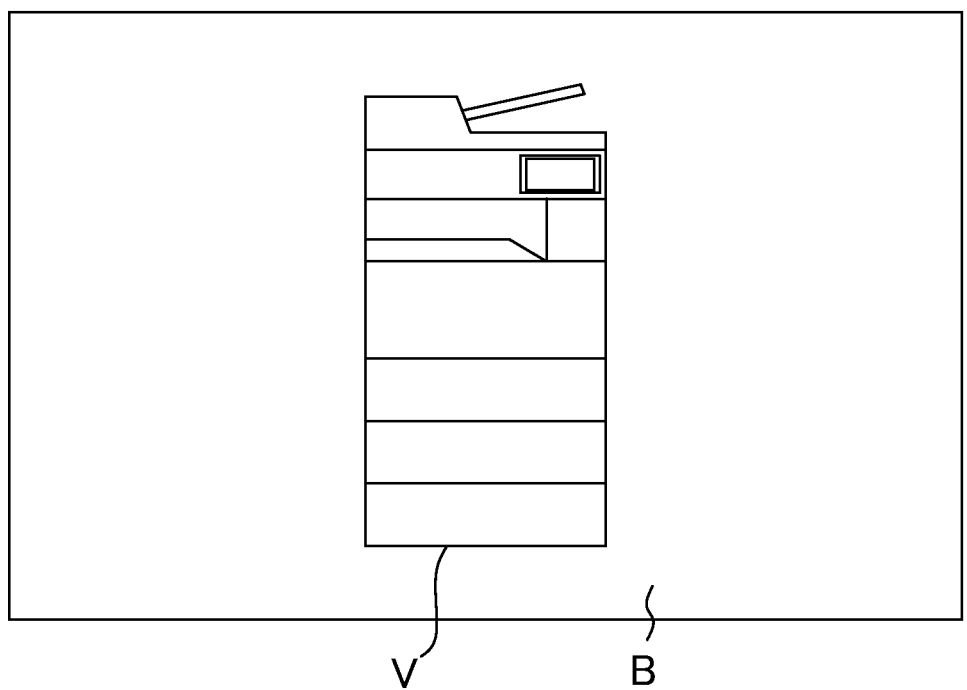
FIG. 3 is a diagram showing an example of a base image on a trouble-displaying image.

FIG. 3 is a diagram showing an example of the base image B on the trouble-displaying image. At the center of the base image B, an appearance diagram V of the image forming apparatus 1 is displayed.

Figure 4A:
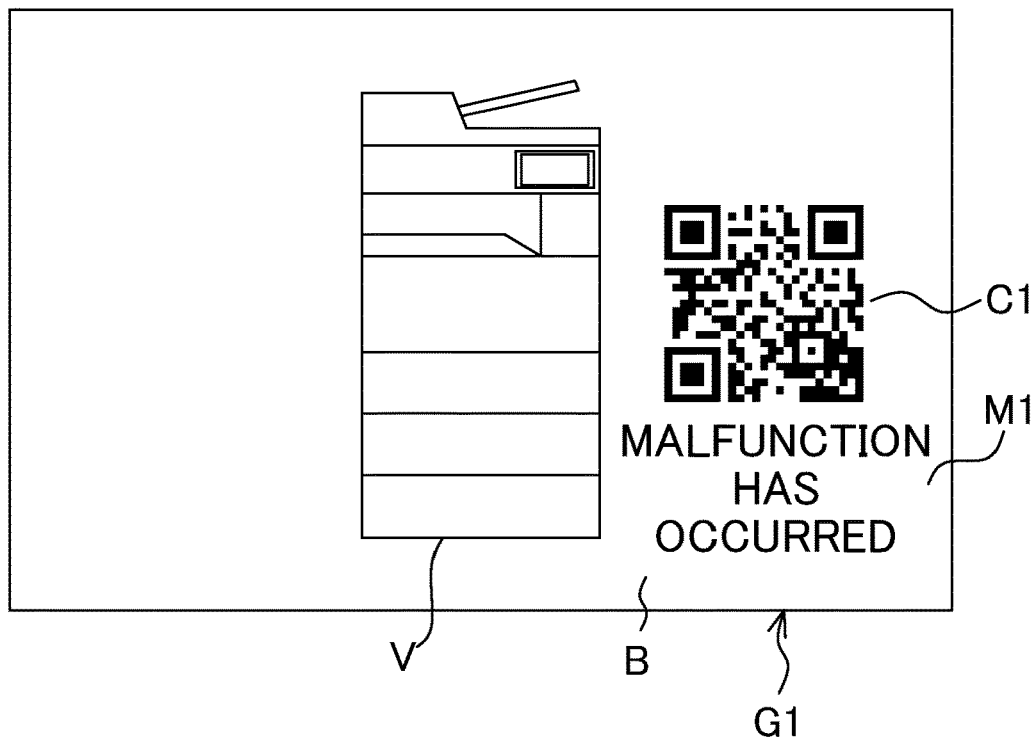
FIG. 4A and FIG. 4B are diagrams each showing an example of the trouble-displaying image.
Figure 4B:
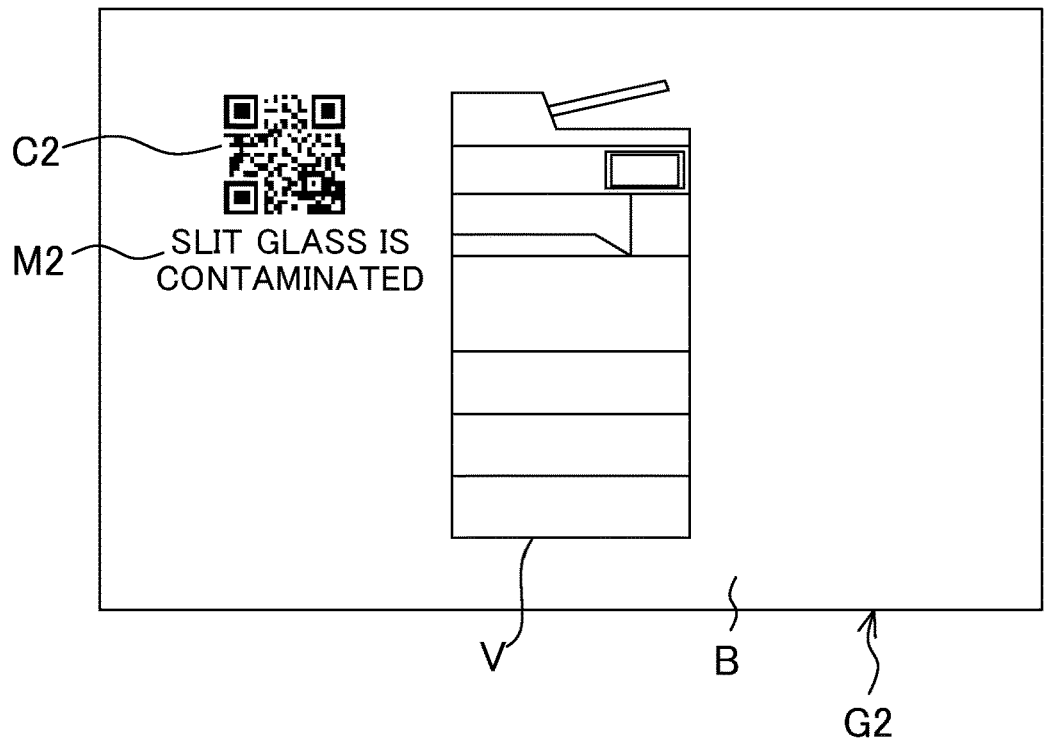

FIG. 4A and FIG. 4B are diagrams each showing an example of the trouble-displaying image. A trouble-displaying image G1 shown in FIG. 4A contains on the base image B a QR code C1 and message M1, which are large in size. A trouble-displaying image G2 shown in FIG. 4B displays on the base image B a QR code C2 and message M2, which are small in size.

Figure 5:
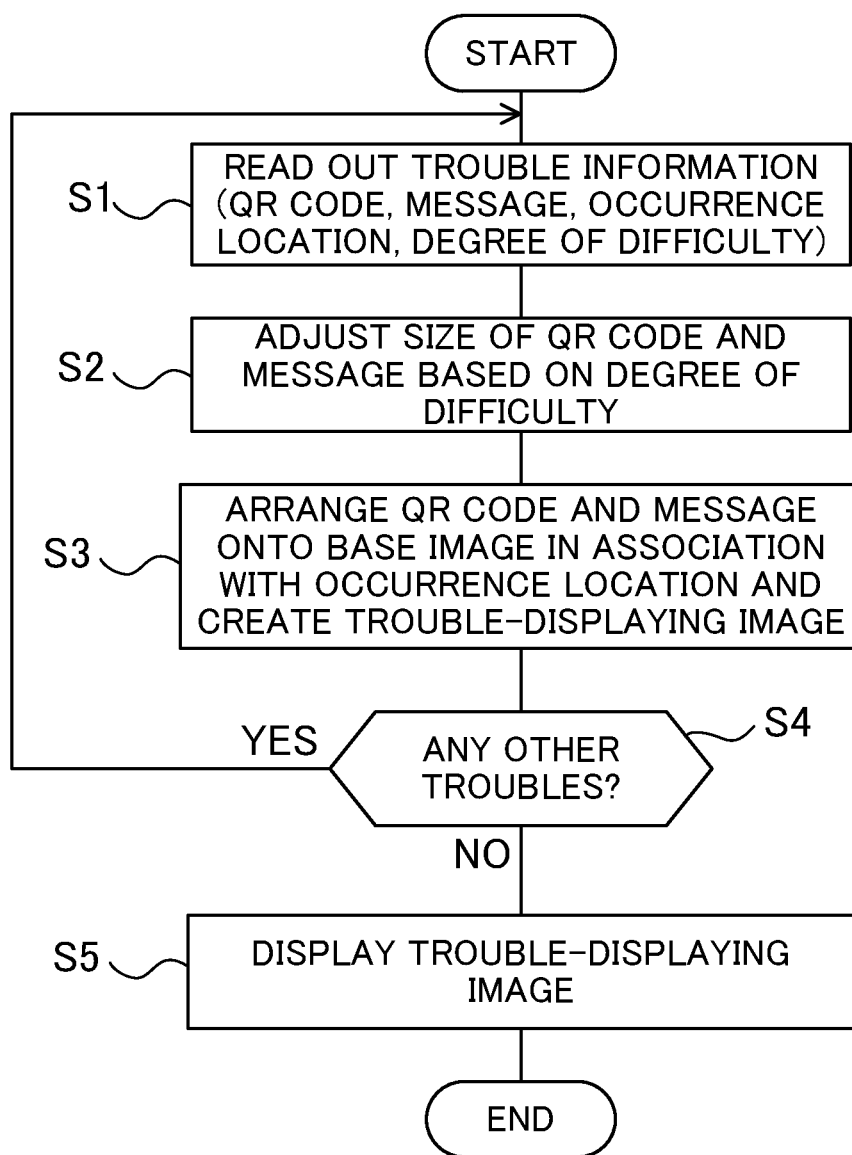
FIG. 5 is a flowchart showing an example of processing performed by a control device in the image forming apparatus according to a first embodiment.

Next, an example of processing performed by the control device 10 in the image forming apparatus 1 according to the first embodiment will be described based on a flowchart shown in FIG. 5. This processing is performed when the detector 102 detects a trouble (or troubles).

The controller 100 firstly reads out from the trouble information storage device 112 trouble information (QR code, message, occurrence location, and degree of difficulty) corresponding to the trouble code indicating the trouble that the detector 102 detected (S1) and, based on the degree of difficulty read out and the size table 113 (see FIG. 6) prepared in advance, determines a size of the QR code and message to create the QR code and the message in the determined size (S2). Hereinafter, to determine and to create are referred to as "to adjust".

FIG. 6 is a diagram showing an example of the size table 113. The size table 113 stores a display size of the QR code and message in cross-reference with the degree of difficulty. Examples stored in the size table 113 are as follows: in the case where the degree of difficulty is "3", the highest, the size be 125% of a predetermined reference size; in the case where the degree of difficulty is "2", the size be the reference size; and in the case where the degree of difficulty is "1", the size be 75% of the reference size. The size table 113 is, for example, stored in the trouble information storage device 112 in the HDD 111.

The controller 100 arranges the size-adjusted QR code and message on the base image B (FIG. 3) in association with a position on the appearance diagram V (FIG. 3) corresponding to the trouble occurrence location, and creates the trouble-displaying image (S3). For example, the controller 100 arranges the QR code and message near the trouble occurrence location.

As shown in FIG. 4A, on the trouble-displaying image G1, the controller 100 arranges the large-sized QR code C1 and message M1 near the location where the corresponding trouble is occurred (i.e., near the image forming device). As shown in FIG. 4B, on the trouble-displaying image G2, the controller 100 arranges the small-sized QR code C2 and message M2 near the location where the corresponding trouble is occurred (i.e., near the image reading device).

Figure 7A:
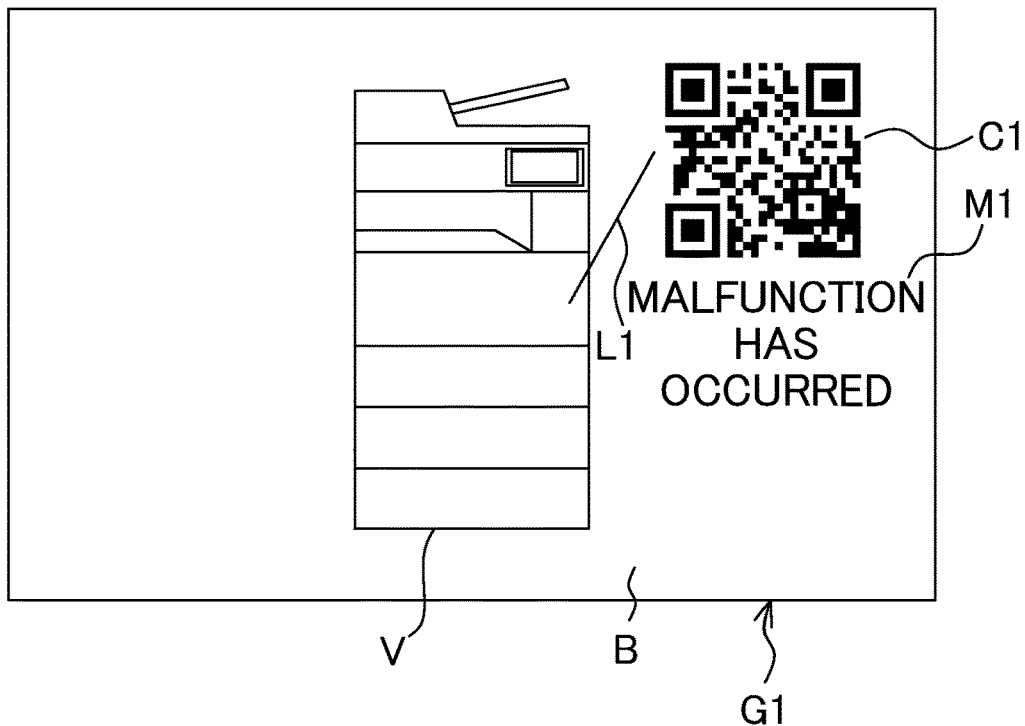
FIG. 7A and FIG. 7B are diagrams each showing an example of the trouble-displaying image.
Figure 7B:
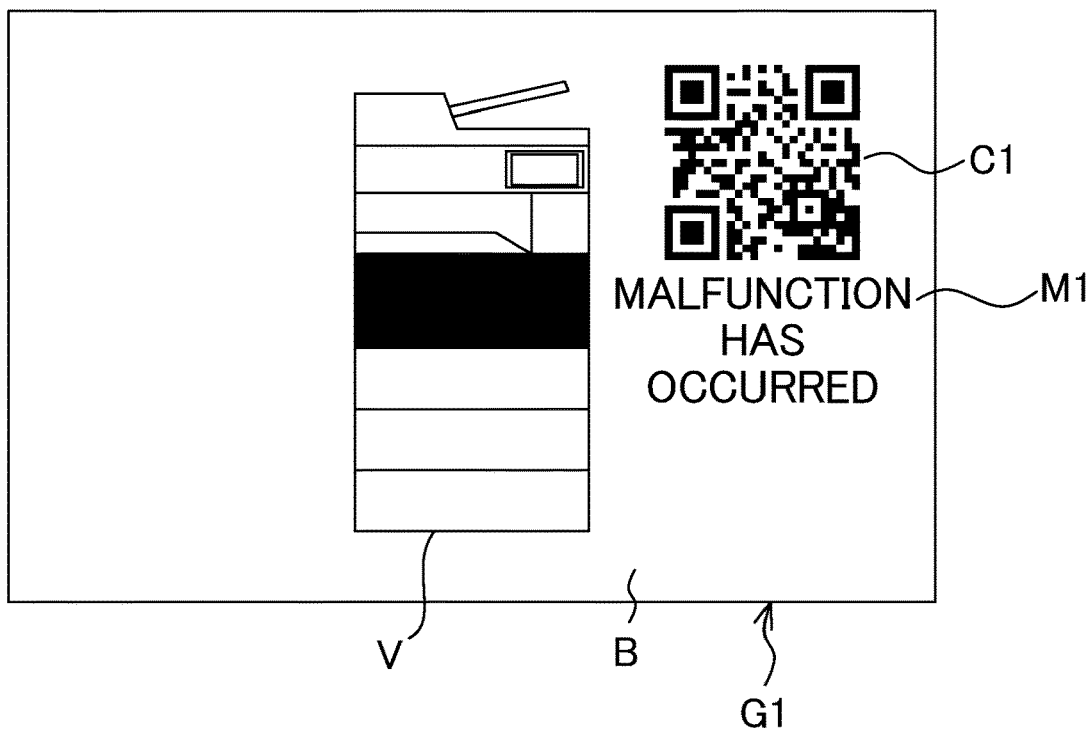

In the above description, by arranging the QR code and message near the trouble occurrence location, the QR code and the position corresponding to the trouble occurrence location are associated. In another embodiment, the controller 100 may associate the QR code C1 with the position corresponding to the trouble occurrence location by use of a leader line L1 as shown in FIG. 7A. In still another embodiment, the controller 100 may display the trouble occurrence location with a display manner (here, paint-out) different from that of other positions as shown in FIG. 7B. Further, the leader line L1 or the paint-out may be adopted as another embodiment of the second to fifth embodiments described later.

The controller 100 then determines whether the detector 102 is detecting any other troubles (S4). When it is determined that the detector 102 is detecting other troubles (YES at S4), processing returns to step S1, and the controller 100 repeats steps S1 to S4 for each of other troubles. In this case, the controller 100 adjusts the size of QR code and message corresponding to each of other troubles (S2), adds the size-adjusted QR code and message onto the base image B, and updates the trouble-displaying image (S3). In this way, as long as a trouble is being detected, the controller 100 creates the QR code and message corresponding to the trouble and updates the trouble-displaying image.

In determining that the detector 102 is not detecting any other troubles (NO at S4), the controller 100 causes the display 473 to display the trouble-displaying image created in the step S3 and finally updated (S5). The processing ends thereafter.

Figure 8A:
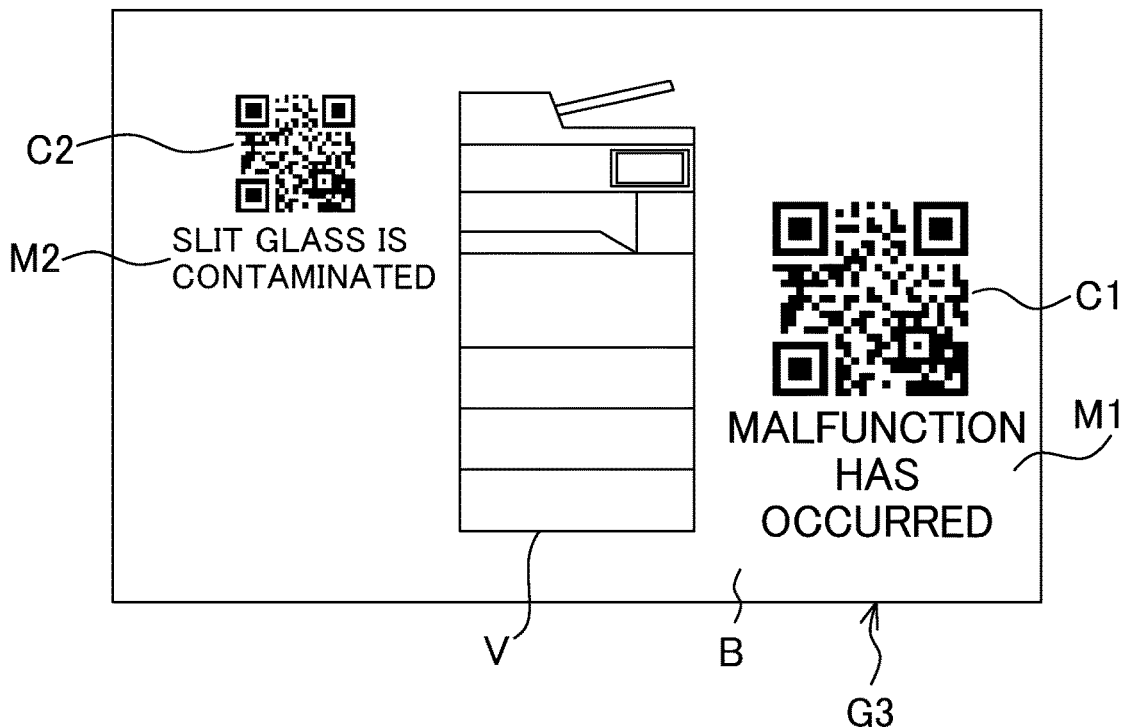
FIG. 8A and FIG. 8B are diagrams each showing an example of the trouble-displaying image.
Figure 8B:
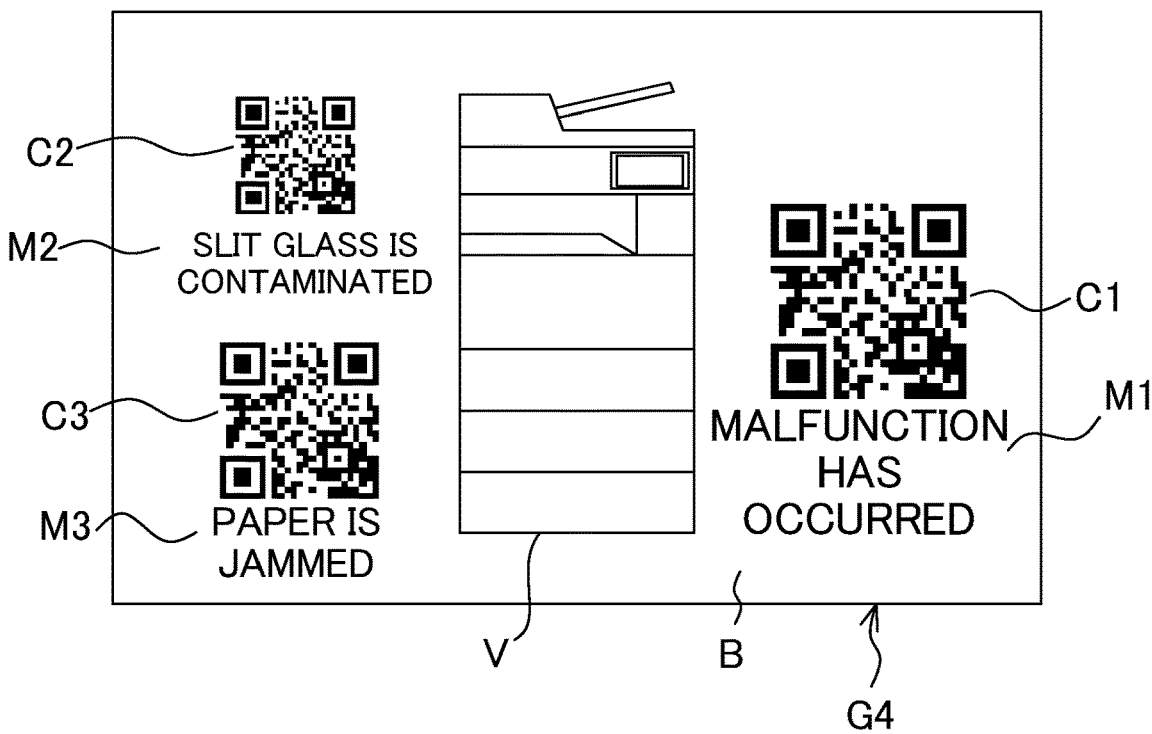

FIG. 8A and FIG. 8B are diagrams each showing an example of the trouble-displaying image on which more than one QR code is displayed. FIG. 8A shows an example where two QR codes and messages are created by the controller 100 and where, on a trouble-displaying image G3, the large-sized QR code C1 and message M1 and the small-sized QR code C2 and message M2 are displayed.

FIG. 8B shows an example where three QR codes and messages are created by the controller 100 and where, on a trouble-displaying image G4, the large-sized QR code C1 and message M1, the small-sized QR code C2 and message M2, and a medium-sized QR code C3 and message M3 are displayed.

According to the first embodiment, since the display 473 displays the QR code in which the storage location on the network (URL) (the location being where the information indicating the method for dealing with the trouble is stored) is converted into an image, the user can easily check the method for dealing with the trouble by using a portable device (such as a smartphone) having functions of reading the QR code and browsing information on the network.

Furthermore, because when the difficulty in solving the trouble is high, the QR code is displayed in a large size, the user can know the difficulty in solving the trouble at a glance. Therefore, the user can easily take an appropriate measure corresponding to the difficulty, so that the time required in solving the trouble having occurred can be shortened than before.

When the trouble is, for example, as simple as "cover is open", because the method for dealing with the trouble is easy, displaying the dealing method on the display is enough to explain how to deal with the trouble. If the trouble is complicated, however, it is difficult to explain the dealing method only by displaying the message on the display. Thus, a service code is displayed on the display when the trouble is complicated.

When the service code is displayed on the display, the user needs to use the personal computer or smartphone to open the home page and search for the service code. By doing so, it takes a long time to confirm the method for dealing with the trouble, and as a result, the time until the trouble is solved becomes longer.

Some troubles can be solved by the user him/herself but other troubles, such as malfunction (failure), cannot be solved by the user him/herself and must be solved by a service person (for example, person who has maintenance abilities) of the place of purchase or manufacturer. In other words, there are differences in the difficulty in solving the trouble. Moreover, some trouble is urgent and needs to be dealt with right away, while other troubles may have no problem in being left unsolved for some time. That is, there are differences in the seriousness of the trouble, too.

It is conceivable that how the trouble should be dealt with may differ greatly (especially, in the initial response) depending on the differences between the difficulty and seriousness. For example, when the trouble the user cannot deal with him/herself occurs, it is suggested to immediately contact a service center such as "customer consultation desk" of the place of purchase or manufacturer, and call for a service representative. Conversely, if the user calls for the service representative even in the case where the trouble can be easily solved by the user him/herself, it ends up wasting time and increasing the time necessary to solve the trouble.

There is an image forming apparatus of the first example that acquires help information corresponding to the condition of the own apparatus. This apparatus, however, cannot deal with the differences in the difficulty in solving the trouble and the seriousness of the trouble. Also, an image forming apparatus of the second example shows information on the own apparatus by a two-dimensional code. This apparatus, just like aforesaid the image forming apparatus of the first example, cannot deal with the differences in the difficulty in solving the trouble and the seriousness of the trouble.

On the other hand, in this embodiment, the user can easily know the difficulty in solving the trouble and the seriousness of the trouble, and the user can easily take an appropriate response according to the difficulty and seriousness.

Figure 9:
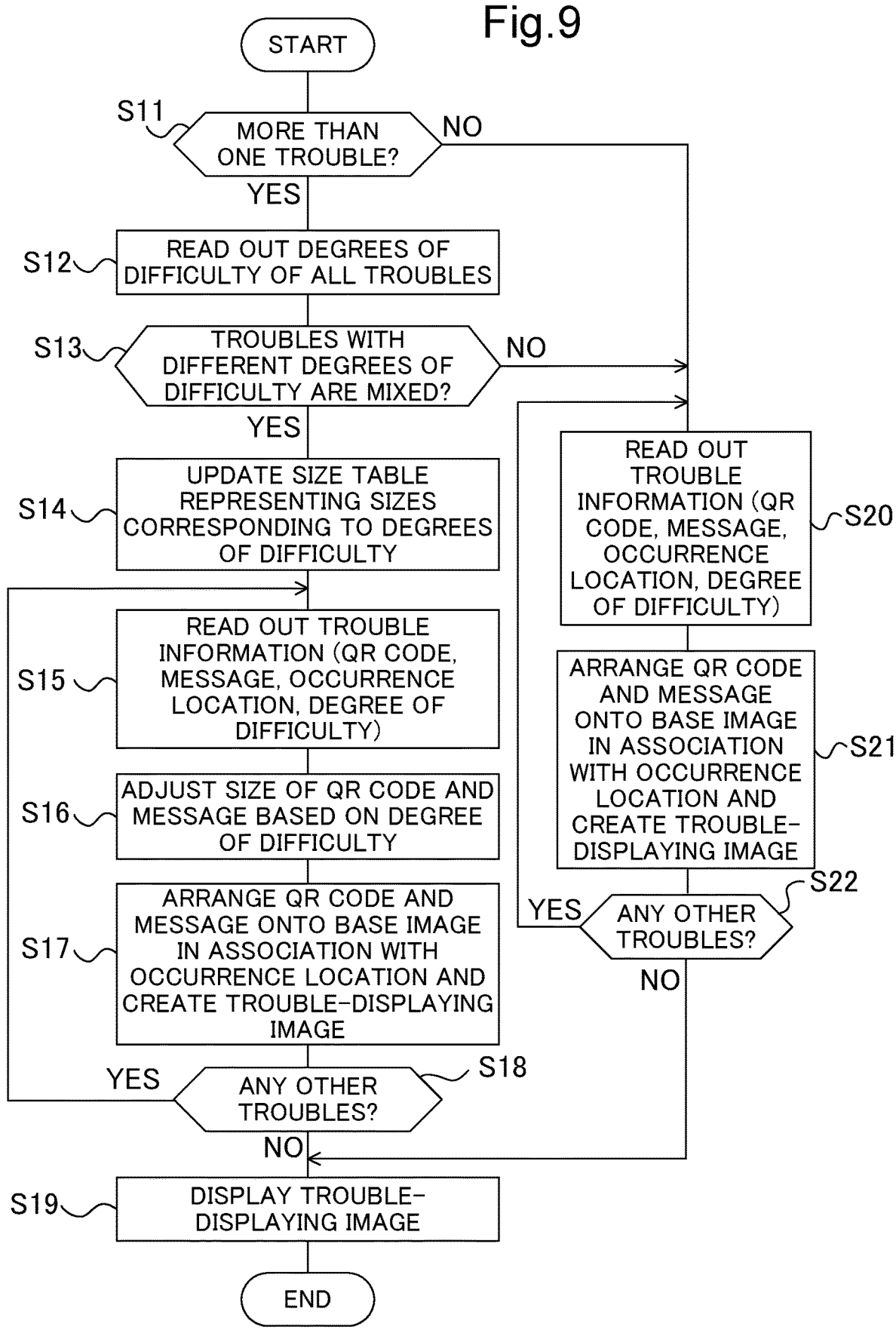
FIG. 9 is a flowchart showing an example of processing performed by the control device in the image forming apparatus according to a second embodiment.

Next, an example of processing performed by the control device 10 in the image forming apparatus 1 according to the second embodiment will be described based on a flowchart shown in FIG. 9. This processing is performed when the detector 102 detects a trouble (or troubles).

In the first embodiment, the controller 100 determines the sizes of the QR codes without comparing the degrees of difficulty with other troubles when more than one trouble is occurred. In contrast, the second embodiment compares the degrees of difficulty with other troubles and based on each comparison result (i.e., according to the correlation between the degree of difficulty of each trouble), determines the size of the QR code corresponding to each trouble. The second embodiment differs from the first embodiment in this point.

The controller 100 firstly determines whether the number of troubles detected by the detector 102 is more than one (S11) and, when determining that there is more than one trouble (YES at S11), reads out from the trouble information storage device 112 the degrees of difficulty of all the troubles that the detector 102 has detected (S12). Based on the degrees of difficulty read out, the controller 100 determines whether troubles with different degrees of difficulty are mixed in the troubles detected by the detector 102 (S13). For example, when the degrees of difficulty of the troubles detected by the detector 102 are all "2", the determination at step S13 is "NO".

In determining that the troubles detected by the detector 102 contain the troubles with different degrees of difficulty (YES at S13), the controller 100 updates the size table 113 storing the display size of the QR code and message in cross-reference with the degree of difficulty (S14).

Figure 10A:
FIG. 10A to FIG. 10D are diagrams each showing an example of the size table.
Figure 10B:
Figure 10C:
Figure 10D:

For example, when the degrees of difficulty "1" to "3" are all contained, the size table 113 is as shown in FIG. 10A. When the degrees of difficulty "2" and "3" are contained but there is no "1", the controller 100 updates the size table 113 as shown in FIG. 10B. When the degrees of difficulty "1" and "3" are contained but there is no "2", the controller 100 updates the size table 113 as shown in FIG. 10C. When the degrees of difficulty "1" and "2" are contained but there is no "3", the controller 100 updates the size table 113 as shown in FIG. 10D.

The controller 100 reads out from the trouble information storage device 112 the trouble information (QR code, message, occurrence location, and degree of difficulty) corresponding to the trouble code indicating a trouble detected by the detector 102 (S15) and, based on the degree of difficulty read out and the updated size table 113, adjusts the size of the QR code and message (S16).

Subsequently, the controller 100 arranges the size-adjusted QR code and message on the base image B (FIG. 3) in association with the position on the appearance diagram V (FIG. 3) corresponding to the trouble occurrence location, and creates the trouble-displaying image (S17).

The controller 100 then determines whether the detector 102 is detecting any other troubles (S18). When it is determined that the detector 102 is detecting other troubles (YES at S18), processing returns to step S15, and the controller 100 repeats steps S15 to S18 for each of other troubles. In this case, the controller 100 adjusts the size of QR code and message corresponding to each of other troubles (S15, S16), adds the size-adjusted QR code and message onto the base image B, and updates the trouble-displaying image (S17).

In determining that the detector 102 is not detecting any other troubles (NO at S18), the controller 100 causes the display 473 to display the trouble-displaying image created in the step S17 and finally updated (S19). The processing ends thereafter.

When the controller 100 determines at step S11 that the number of troubles detected by the detector 102 is one (NO at S11) and at step S13 that troubles with different degrees of difficulty are not mixed in the troubles detected by the detector 102 (NO at S13), the controller 100 reads out from the trouble information storage device 112 the trouble information (QR code, message, occurrence location, and degree of difficulty) corresponding to the trouble code indicating the trouble that the detector 102 detected (S20), arranges the size-adjusted QR code and message on the base image B in association with the position on the appearance diagram V corresponding to the trouble occurrence location, and creates the trouble-displaying image (S21). When the trouble detected by the detector 102 is more than one, the controller 100 performs the steps S20 and S21 for each of the troubles (YES at S22, and S20, S21). When the trouble detected by the detector 102 is one, the controller 100 performs the steps S20 and S21 for the one trouble only. Then the controller 100 adds the QR code and the message created in this way (NO at S22) onto the base image B and updates the trouble-displaying image (S19). The processing ends thereafter.

Figure 11:
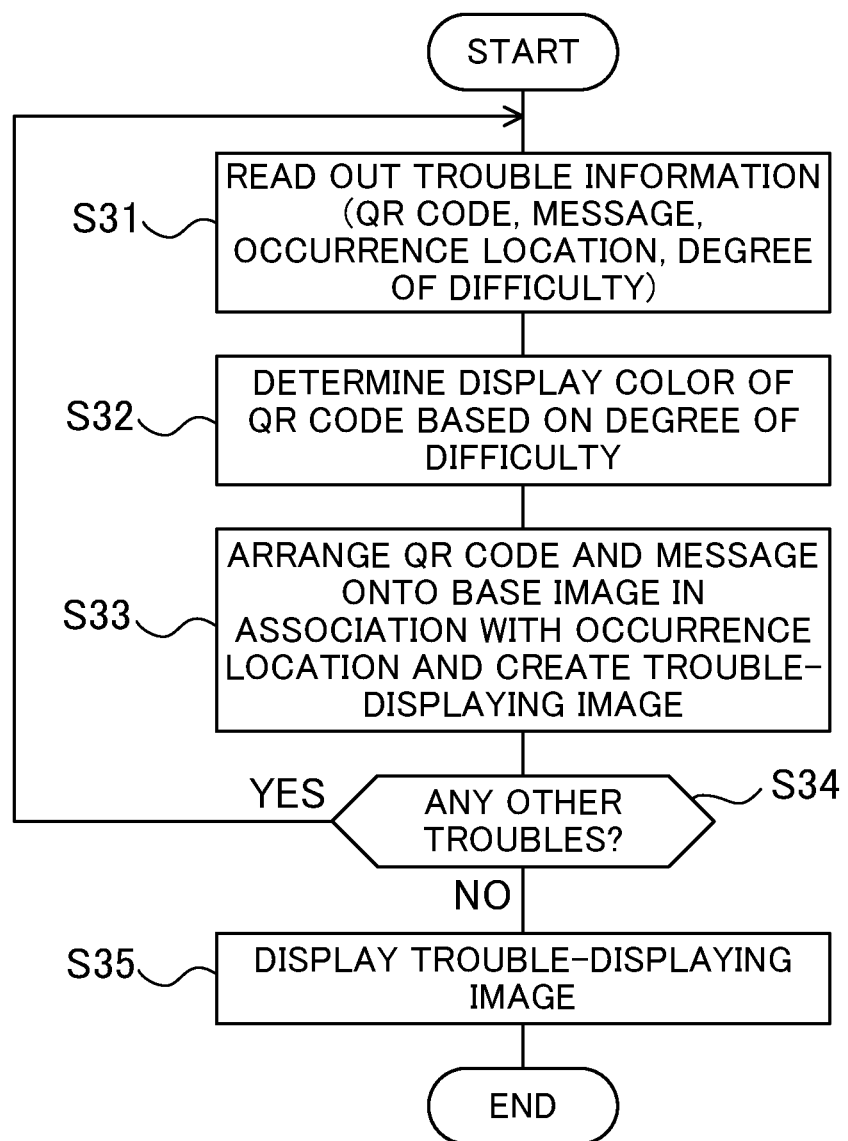
FIG. 11 is a flowchart showing an example of processing performed by the control device in the image forming apparatus according to a third embodiment.

Next, an example of processing performed by the control device 10 in the image forming apparatus 1 according to the third embodiment will be described based on a flowchart shown in FIG. 11. This processing is performed when the detector 102 detects a trouble (or troubles).

In the first and second embodiments, based on the difficulty (degree of difficulty) in solving the trouble, the size of the QR code is adjusted. The third embodiment differs from the first embodiment in that a display color of QR code is determined based on the degree of difficulty.

The controller 100 firstly reads out from the trouble information storage device 112 the trouble information (QR code, message, occurrence location, and degree of difficulty) corresponding to the trouble code indicating the trouble that the detector 102 detected (S31), determines the display color of the QR code based on the degree of difficulty read out and a display color table 114 prepared in advance (see FIG. 12) (S32) to create the QR code in the determined display color, and creates the message in a predetermined display color. The controller 100 may use the display color of the QR code determined in this manner also in creating the message (hereinafter, the same applies to each embodiment).

FIG. 12 is a diagram showing an example of the display color table 114. The display color table 114 stores display color of the QR code in cross-reference with the degree of difficulty. Examples stored in the display color table 114 are as follows: in the case where the degree of difficulty is "3", the highest, the display color is red; in the case where the degree of difficulty is "2", the display color is yellow; and in the case where the degree of difficulty is "1", the display color is black. That is, the display color is set so that the redness increases as the degree of difficulty becomes higher.

Warm colors such as red and yellow are colors that people tend to associate with a danger and caution. On the other hand, cold colors such as green and blue are colors that people tend to associate with safety. In safety colors of Japanese Industrial Standards (JIS), red is used to indicate prohibition and danger, and yellow is used to indicate caution. Therefore, to set the display color in the manner that the redness increases as the degree of difficulty becomes higher is suited to let people recognize the degree of difficulty.

The controller 100 arranges the QR code whose display color has been adjusted and the message on the base image B (FIG. 3) in association with the position on the appearance diagram V (FIG. 3) corresponding to the trouble occurrence location, and creates the trouble-displaying image (S33).

Figure 13A:
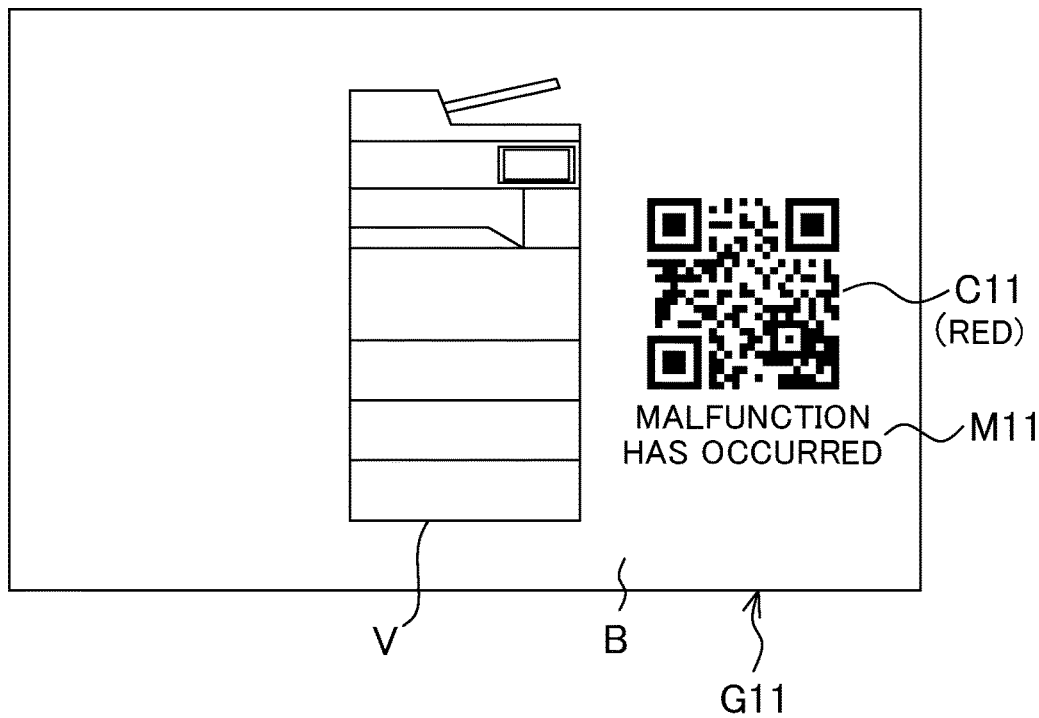
FIG. 13A and FIG. 13B are diagrams each showing an example of the trouble-displaying image.
Figure 13B:
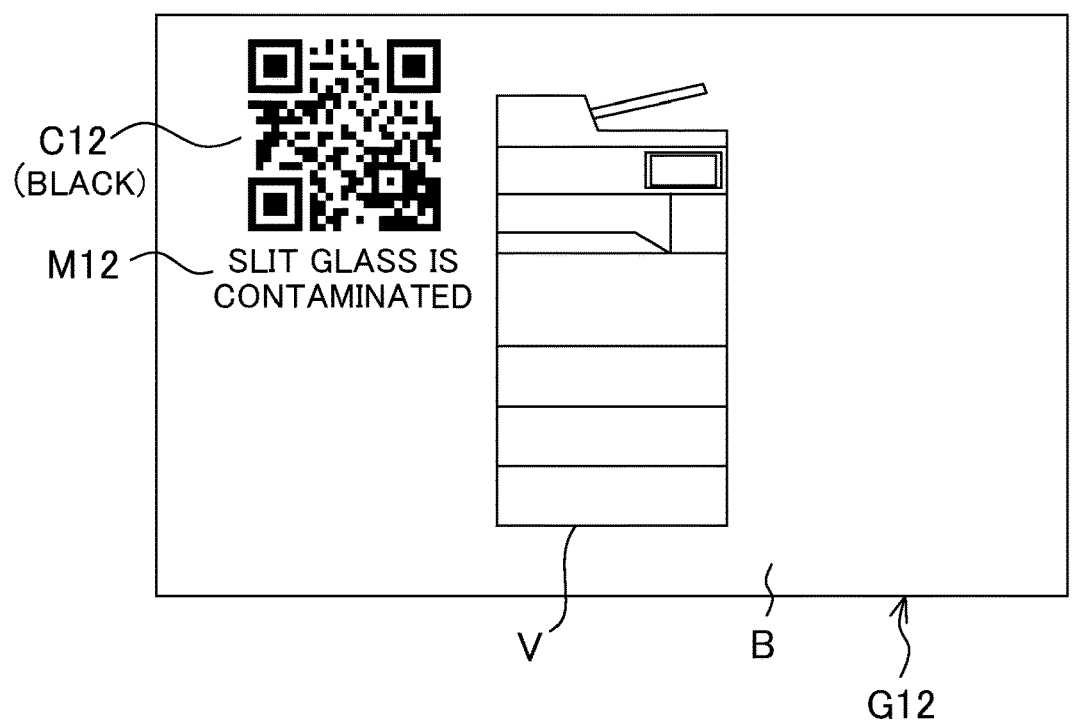

FIG. 13A and FIG. 13B are diagrams each showing an example of the trouble-displaying image. As shown in FIG. 13A, a trouble-displaying image G11 contains a QR code C11 displayed in red and a message M11 and as shown in FIG. 13B, a trouble-displaying image G12 contains a QR code C12 displayed in black and a message M12.

The controller 100 then determines whether the detector 102 is detecting any other troubles (S34). When it is determined that the detector 102 is detecting other troubles (YES at S34), processing returns to step S31, and the controller 100 determines the display color of the QR code corresponding to each of other troubles (S32), adds onto the base image B the QR code created in the determined display color and the created message, and updates the trouble-displaying image (S33).

In determining that the detector 102 is not detecting any other troubles (NO at S34), the controller 100 causes the display 473 to display the trouble-displaying image created in the step S33 (S35). The processing ends thereafter.

Figure 14A:
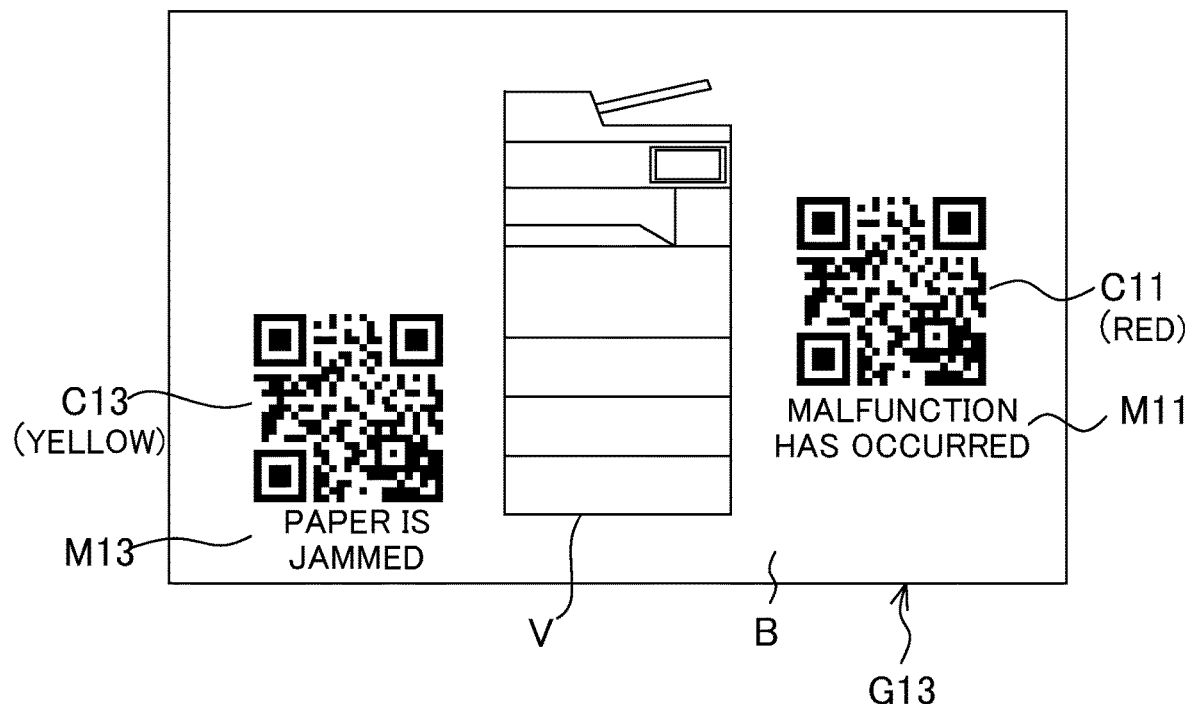
FIG. 14A and FIG. 14B are diagrams each showing an example of the trouble-displaying image.
Figure 14B:
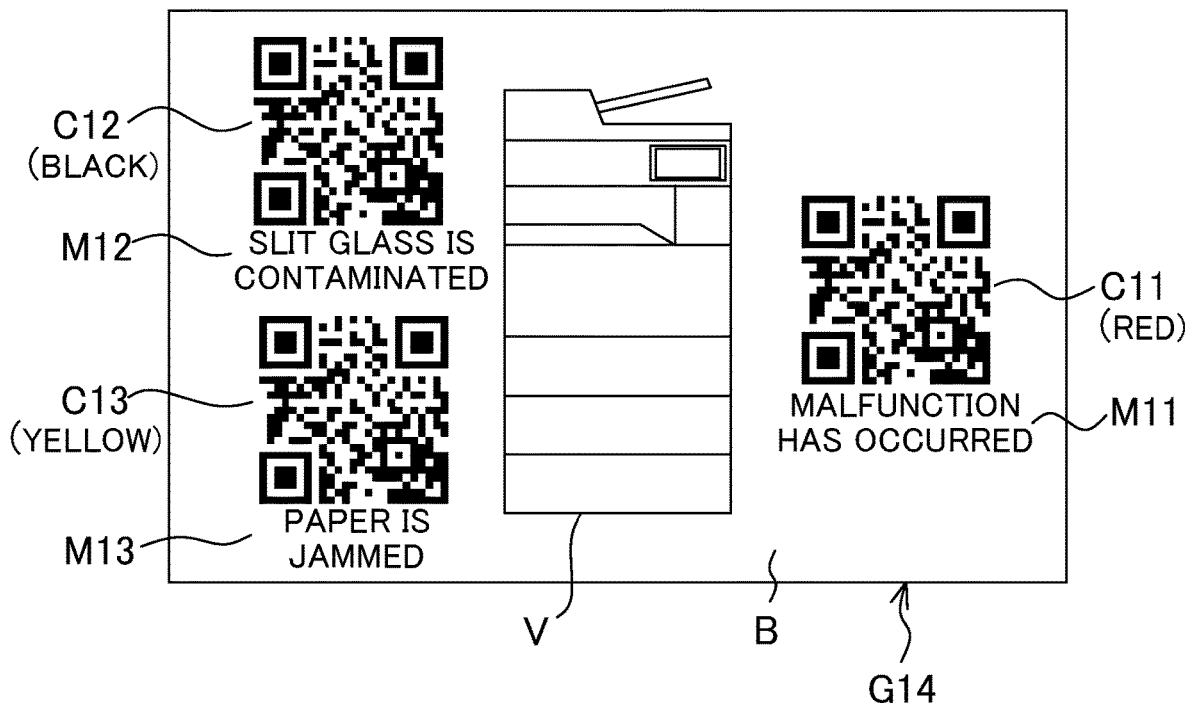

FIG. 14A and FIG. 14B are diagrams each showing an example of the trouble-displaying image on which more than one QR code is displayed. FIG. 14A shows an example of a trouble-displaying image G13 containing the QR code C11 displayed in red and a QR code C13 displayed in yellow. FIG. 14B shows an example of a trouble-displaying image G14 containing the QR code C11 displayed in red, the QR code C12 displayed in black, and the QR code C13 displayed in yellow.

In the third embodiment, because the display color of the QR code is changed in accordance with the difficulty (the degree of difficulty) in solving the trouble (such that if the degree of difficulty is high, the display color is changed to red), the user can know the difficulty in solving the trouble at a glance. Therefore, the user can easily take an appropriate measure corresponding to the difficulty, so that the time required in solving the trouble having occurred can be shortened than before.

Although in the above embodiment the three levels of color coding are presented in red and yellow (warm colors) and black, the display colors are not limited to these. When four or five levels are required to be presented, it helps the visibility of the user if cold colors such as green and blue in addition to these three colors are used.

Figure 15:
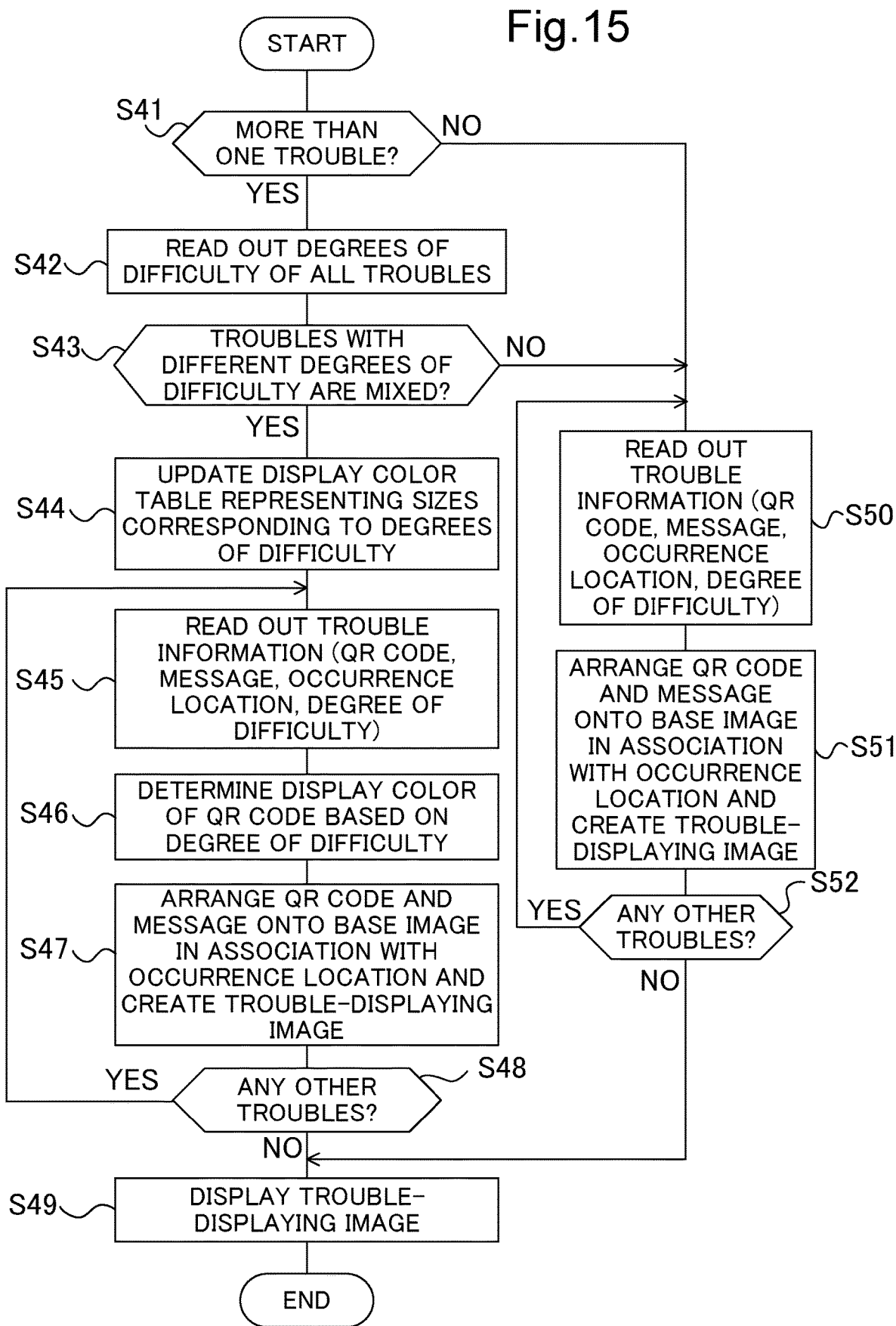
FIG. 15 is a flowchart showing an example of processing performed by the control device in the image forming apparatus according to a fourth embodiment.

Next, an example of processing performed by the control device 10 in the image forming apparatus 1 according to the fourth embodiment will be described based on a flowchart shown in FIG. 15. This processing is performed when the detector 102 detects a trouble (or troubles).

In the third embodiment, the controller 100 determines the display colors of the QR codes without comparing the degrees of difficulty with other troubles when more than one trouble is occurred. In contrast, the fourth embodiment compares the degrees of difficulty with other troubles and based on each result (i.e., according to the correlation between the degree of difficulty of each trouble), determines the display color of the QR code corresponding to each trouble. The fourth embodiment differs from the third embodiment in this point.

The controller 100 firstly determines whether the number of troubles detected by the detector 102 is more than one (S41) and, when determining that there is more than one trouble (YES at S41), reads out from the trouble information storage device 112 the degrees of difficulty of all the troubles that the detector 102 has detected (S42). Based on the degrees of difficulty read out, the controller 100 determines whether troubles with different degrees of difficulty are mixed in the troubles detected by the detector 102 (S43). For example, when the degrees of difficulty of the troubles detected by the detector 102 are all "2", the determination at step S43 is "NO".

In determining that the troubles detected by the detector 102 contain the troubles with different degrees of difficulty (YES at S43), the controller 100 updates the display color table 114 storing the display color of the QR code in cross-reference with the degree of difficulty (S44).

Figure 16A:
FIG. 16A to FIG. 16D are diagrams each showing an example of a display color size table.
Figure 16B:
Figure 16C:
Figure 16D:

For example, when the degrees of difficulty "1" to "3" are all contained, the display color table 114 is as shown in FIG. 16A. When the degrees of difficulty "2" and "3" are contained but there is no "1", the controller 100 updates the display color table 114 as shown in FIG. 16B. When the degrees of difficulty "1" and "3" are contained but there is no "2", the controller 100 updates the display color table 114 as shown in FIG. 16C. When the degrees of difficulty "1" and "2" are contained but there is no "3", the controller 100 updates the display color table 114 as shown in FIG. 16D.

The controller 100 reads out from the trouble information storage device 112 the trouble information QR code, message, occurrence location, and degree of difficulty) corresponding to the trouble code indicating a trouble detected by the detector 102 (S45) and, based on the degree of difficulty read out and the updated display color table 114, determines the display color of the QR code to create the QR code and message (S46).

Subsequently, in association with the position on the appearance diagram V (FIG. 3) corresponding to the trouble occurrence location, the controller 100 arranges on the base image B (FIG. 3) both the QR code whose display color has been adjusted and the message.

The controller 100 then determines whether the detector 102 is detecting any other troubles (S48). When it is determined that the detector 102 is detecting other troubles (YES at S48), processing returns to step S45, and the controller 100 repeats steps S45 to S48 for each of other troubles. In this case, the controller 100 determines the display color of the QR code corresponding to each of other troubles (S46), adds onto the base image B both the QR code created in the determined display color and the message, and updates the trouble-displaying image (S47). In this way, as long as a trouble is being detected, the controller 100 creates the QR code and message corresponding to the trouble and updates the trouble-displaying image.

In determining that the detector 102 is not detecting any other troubles (NO at S48), the controller 100 causes the display 473 to display the trouble-displaying image created in the step S47 and finally updated (S49). The processing ends thereafter.

When the controller 100 determines at step S41 that the number of the troubles detected by the detector 102 is one (NO at S41) and at step S43 that troubles with different degrees of difficulty are not mixed in the troubles detected by the detector 102 (NO at S43), the controller 100 reads out from the trouble information storage device 112 the trouble information (QR code, message, and occurrence location) corresponding to the trouble code indicating the trouble that the detector 102 detected (S50), arranges, in association with the position on the appearance diagram V corresponding to the trouble occurrence location, the QR code whose display color has been determined and created based on the degree of difficulty similarly to the third embodiment and the message on the base image B, and creates the trouble-displaying image (S51). When the trouble detected by the detector 102 is more than one, the controller 100 performs the steps S50 and S51 for each of the troubles (YES at S52, and S50, S51). When the trouble detected by the detector 102 is one, the controller 100 performs the steps S50 and S51 for the one trouble only. Then the controller 100 adds the QR code and the message created in this way (NO at S52) onto the base image B and updates the trouble-displaying image (S49). The processing ends thereafter.

Figure 17:
FIG. 17 is a diagram showing an example of a data configuration stored in the trouble information storage device.

A description will be given next of the image forming apparatus according to the fifth embodiment. The fifth embodiment differs from the first and second embodiments in that in addition to adjusting the size of the QR code based on the difficulty (degree of difficulty) in solving the trouble, the display color of the QR code is determined based on a predetermined second degree (for example, a degree of danger in solving a trouble) in which an indicator different from the degree of difficulty is used as the indicator. In the fifth embodiment, an item for "degree of danger" is provided in the trouble information storage device 112 as shown in FIG. 17.

Figure 18:
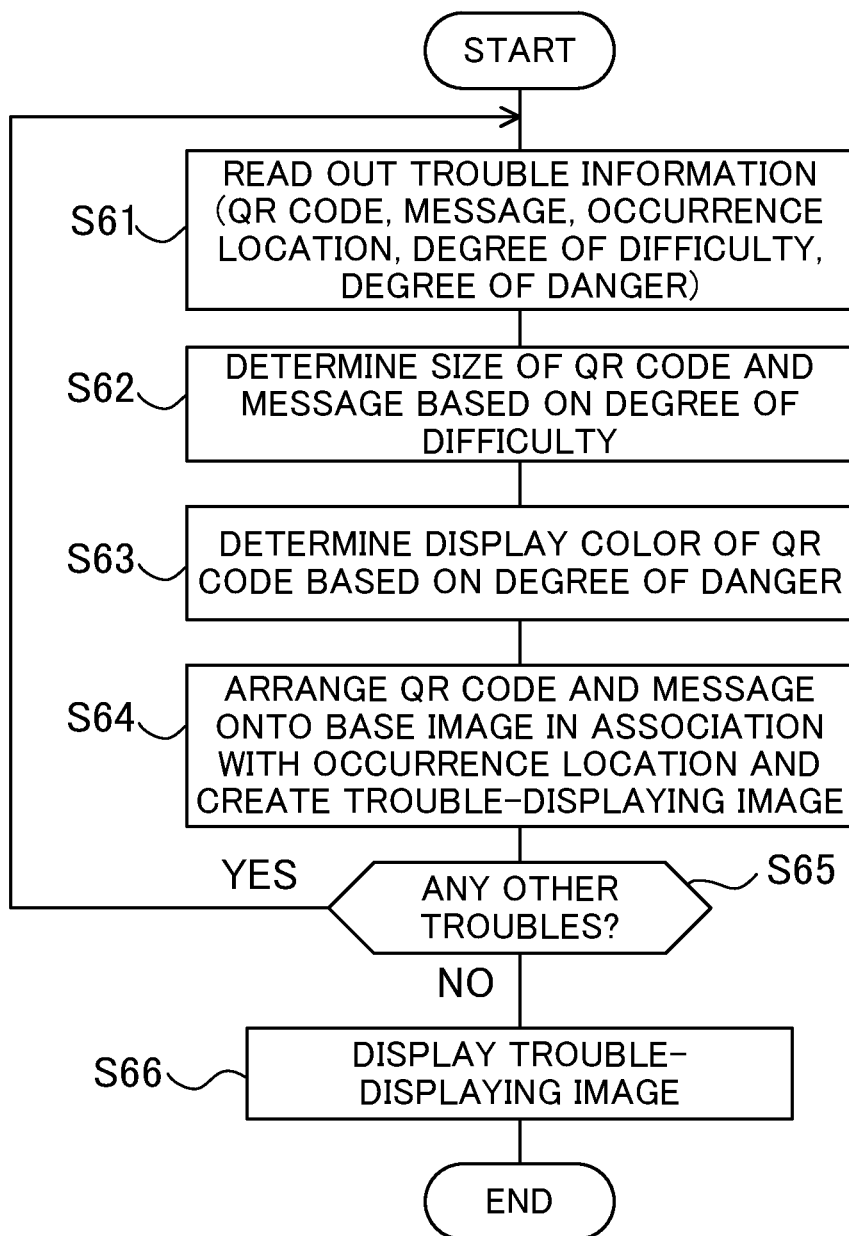
FIG. 18 is a flowchart showing an example of processing performed by the control device in the image forming apparatus according to a fifth embodiment.

FIG. 18 is a flowchart showing an example of processing performed by the control device 10 in the image forming apparatus 1 according to the fifth embodiment. This processing is performed when the detector 102 detects a trouble (or troubles).

The controller 100 firstly reads out from the trouble information storage device 112 (FIG. 17) the trouble information (QR code, message, occurrence location, degree of difficulty, and degree of danger) corresponding to the trouble code indicating the trouble that the detector 102 detected (S61) and, based on the degree of difficulty read out and the size table 113 prepared in advance (FIG. 6), determines the size of the QR code and message (S62).

Based on the degree of danger read out and a display color table 115 (see FIG. 19) prepared in advance in the trouble information storage device 112, the controller 100 determines the display color of the QR code (S63).

FIG. 19 is a diagram showing an example of the display color table. The display color table 115 stores the display color of the QR code in cross-reference with the degree of danger. Examples stored in the display color table 115 are as follows: in the case where the degree of danger is "3", the highest, the display color is red; in the case where the degree of danger is "2", the display color is yellow; and in the case where the degree of danger is "1", the display color is black.

The controller 100 arranges the QR code whose size and display color have been adjusted and the size-adjusted message on the base image B in association with the position on the appearance diagram V corresponding to the trouble occurrence location, and creates the trouble-displaying image (S64).

The controller 100 determines whether the detector 102 is detecting any other troubles (S65). When it is determined that the detector 102 is detecting other troubles (YES at S65), processing returns to step S61, and the controller 100 repeats steps S61 to S65. In this case, the controller 100 adjusts the size of QR code and message corresponding to each of other troubles (S62), determines the display color of the QR code (S63), adds onto the base image B the QR code whose size and display color have been adjusted and the size-adjusted message, and updates the trouble-displaying image (S64). In this way, as long as a trouble is being detected, the controller 100 creates the QR code and message corresponding to the trouble and updates the trouble-displaying image.

In determining that the detector 102 is not detecting any other troubles (NO at S65), the controller 100 causes the display 473 to display the trouble-displaying image created in the step S64 and finally updated (S66). The processing ends thereafter.

Figure 20A:
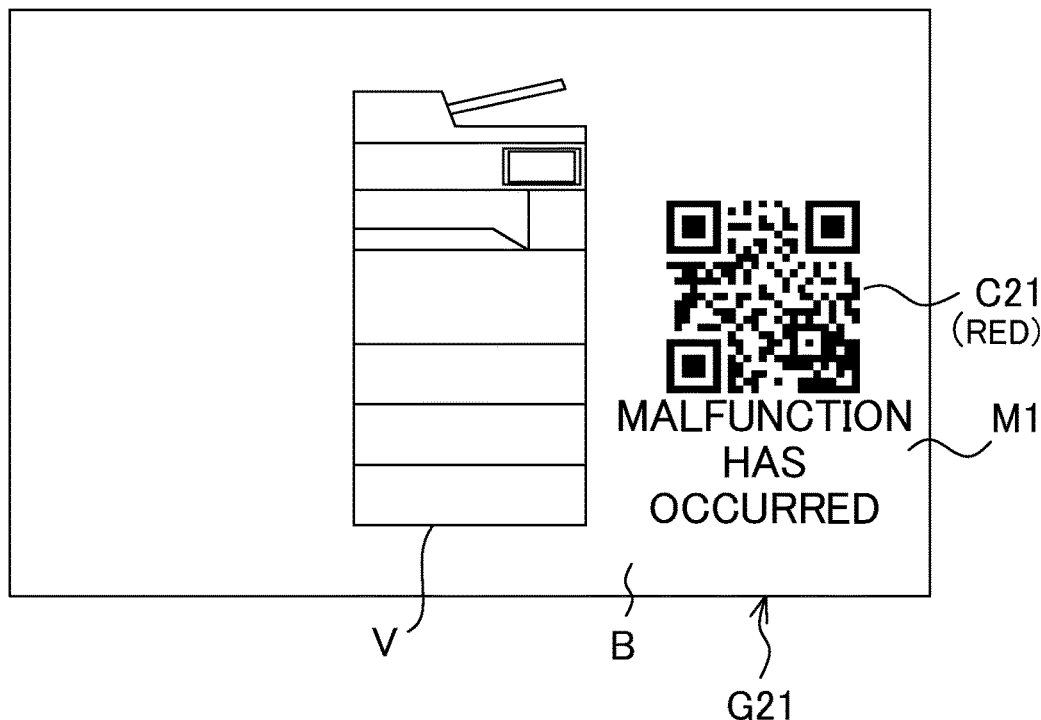
FIG. 20A and FIG. 20B are diagrams each showing an example of the trouble-displaying image.
Figure 20B:
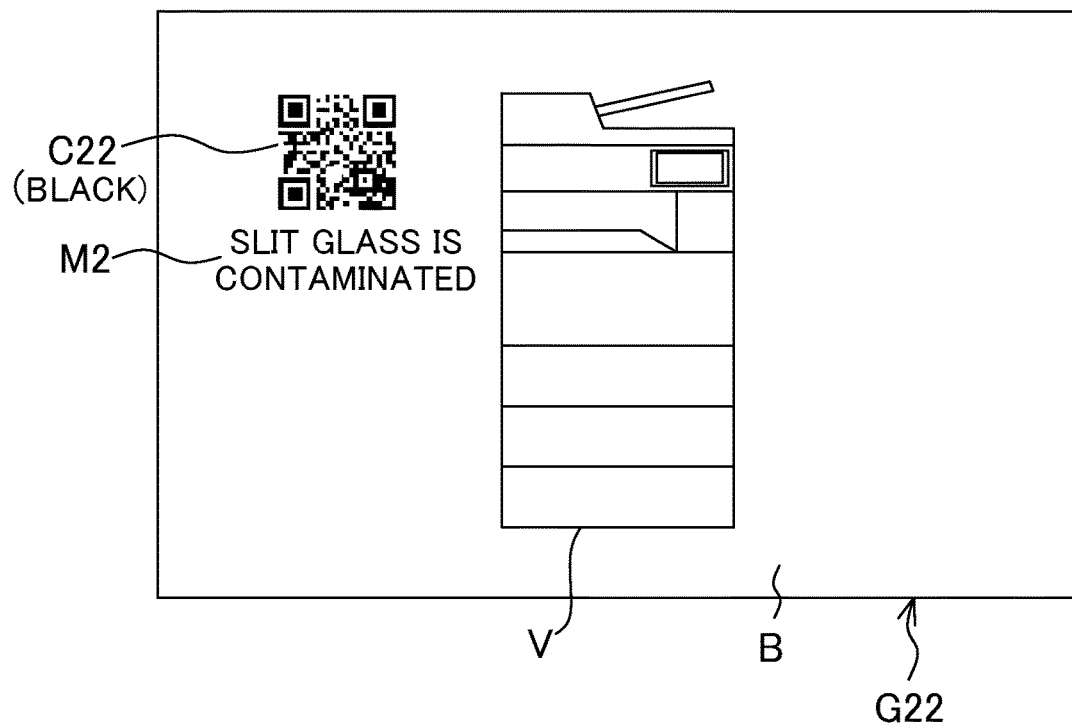

When the detected trouble is only one, for example, as shown in FIG. 20A, a large-sized QR code C21 displayed in red in accordance with the degree of danger is displayed on a trouble-displaying image G21. Alternatively, as shown in FIG. 20B, a small-sized QR code C22 displayed in black in accordance with the degree of danger is displayed on a trouble-displaying image G22.

Figure 21A:
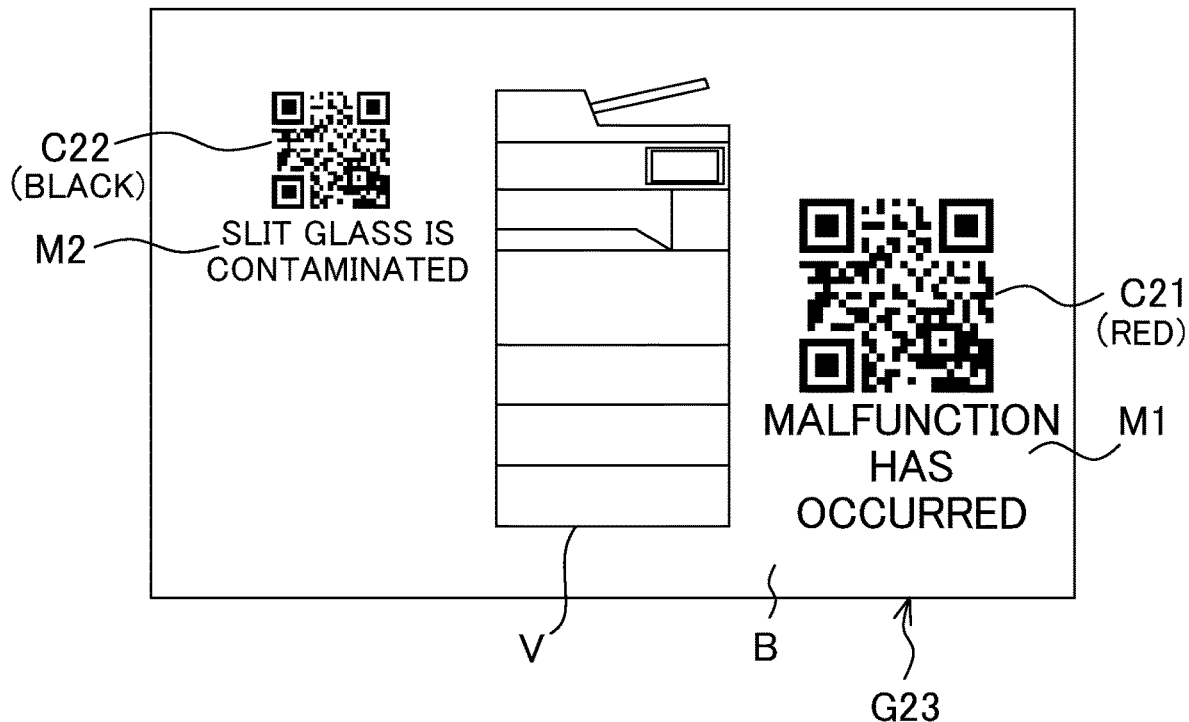
FIG. 21A and FIG. 21B are diagrams each showing an example of the trouble-displaying image.
Figure 21B:
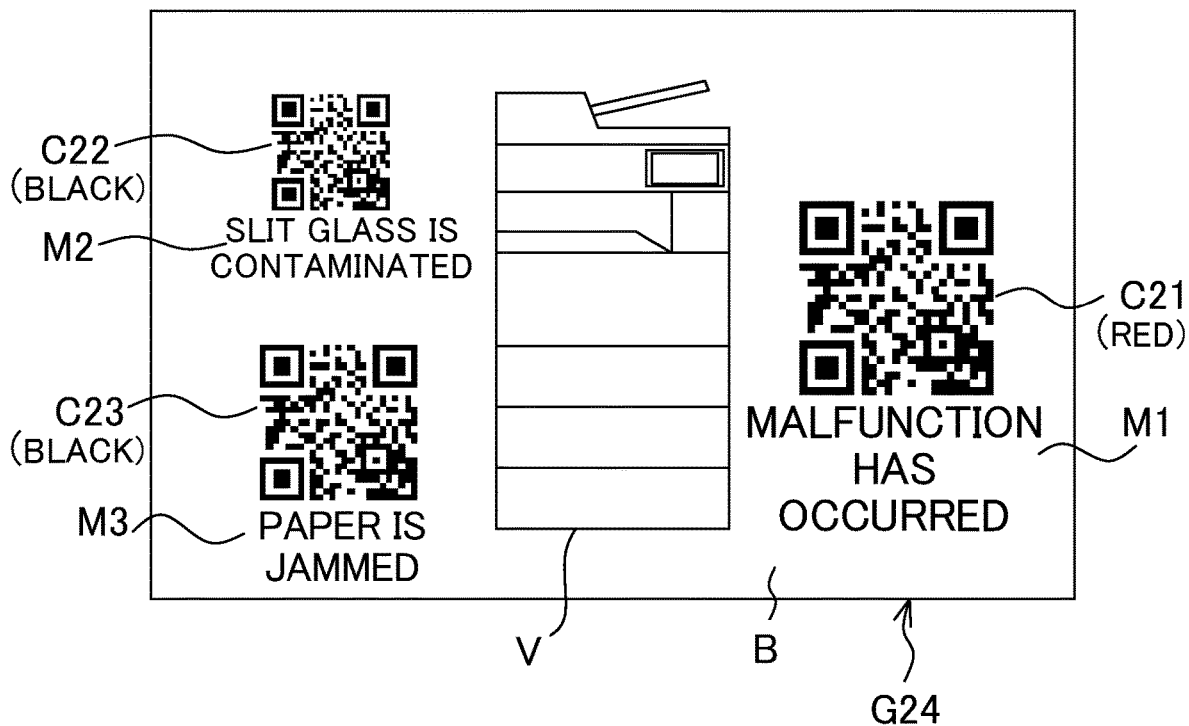

When the detected trouble is more than one, as shown in FIG. 21A, the large-sized QR code C21 displayed in red and the small-sized QR code C22 displayed in black are displayed on a trouble-displaying image G23: the colors of QR codes C21 and C22 have been determined in accordance with the degree of danger, and the sizes of QR codes C21 and C22 have been adjusted in accordance with the degrees of difficulty. Alternatively, as shown in FIG. 21B, the large-sized QR code C21 displayed in red, the small-sized QR code C22 displayed in black, and a middle-sized QR code C23 displayed in black are displayed on a trouble-displaying image G24: the colors of QR codes C21, C22, and C23 have been determined in accordance with the degree of danger, and the sizes of QR codes C21, C22, and C23 have been adjusted in accordance with the degrees of difficulty.

In the fifth embodiment, the controller 100 adjusts display colors of the QR codes without comparing the degrees of danger with other troubles when more than one trouble is occurred. In another embodiment, the controller 100 may adjust display colors of the QR codes based on the results in comparing the degree of danger with other troubles as aforementioned.

Furthermore, as still another embodiment, it may be configured such that the controller 100 adjusts, in addition to adjusting the display color of the QR code based on the difficulty (degree of difficulty) in solving the trouble, the size of the QR code based on the predetermined second degree (degree of danger in solving a trouble) that uses an indicator different from the indicator used in the degree of difficulty.

Although the descriptions have been given for the case of "displaying" on the display 473 with respect to the output of the trouble-displaying image including the QR code, the output is not limited to "displaying".

It may be configured such that the controller 100 controls operation of the image forming device 12, to print the trouble-displaying image on the recording sheet or to transmit, via the network interface 91, the trouble-displaying image to the external apparatus 20 determined in advance. Accordingly, the controller 100 only needs to perform at least one of the above three outputs. However, printing or communication may not be performable because of the occurring trouble so that, as the output of the trouble-displaying image, it is preferable to perform the displaying on the display 473.

In addition, if the detector 102 concurrently detects a number of troubles and a number of QR codes are displayed in the trouble-displaying image, the image may become complicated. To cope with that, in another embodiment, in determining that the number of the QR codes included in the trouble-displaying image is more than a predetermined number (such as 4), the controller 100 may be configured to reduce a size of each image representing an element composing the trouble-displaying image (an appearance diagram, QR code, message, and the like) while maintaining the relative size relationship between each element.

The disclosure is not limited to the foregoing embodiments but may be modified in various manners. Although the image forming apparatus according to the disclosure is exemplified by the multifunction peripheral in the foregoing embodiment, the example is merely illustrative. Other image forming apparatuses having the copy function, printing function, and facsimile function may be used.

Further, the configurations and processing detailed in the foregoing embodiments with reference to FIG. 1 to FIG. 21B are merely exemplary, and not intended to limit the configurations and processing of the disclosure.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
    a display; and
    a control device that includes a processor and, through the processor executing a control program, functions as:
        a detector detecting a trouble occurred in an own apparatus; and
        a controller performing, with respect to a trouble-displaying image including a two-dimensional code in which a storage location on a network is converted into an image, at least one of three outputs of displaying on the display, printing on a recording sheet, and transmitting to an external apparatus, the storage location being a location where information indicating a method for dealing with the trouble detected by the detector is stored,
    wherein based on a predetermined first degree that uses at least either difficulty in solving the trouble or seriousness of the trouble as an indicator, the controller changes a size of the two-dimensional code corresponding to the trouble so as to be larger as the first degree becomes higher, and then outputs the two-dimensional code,
    wherein when more than one two-dimensional code is contained in the trouble-displaying image, the controller changes a size of a two-dimensional code corresponding to a trouble with higher degree so as to be larger than a size of a two-dimensional code corresponding to a trouble with lower degree, and then outputs the two-dimensional codes.

2. An image forming apparatus comprising:
    a display; and
    a control device that includes a processor and, through the processor executing a control program, functions as:
        a detector detecting a trouble occurred in an own apparatus; and
        a controller performing, with respect to a trouble-displaying image including a two-dimensional code in which a storage location on a network is converted into an image, at least one of three outputs of displaying on the display, printing on a recording sheet, and transmitting to an external apparatus, the storage location being a location where information indicating a method for dealing with the trouble detected by the detector is stored,
    wherein based on a predetermined first degree that uses at least either difficulty in solving the trouble or seriousness of the trouble as an indicator, the controller changes a size of the two-dimensional code corresponding to the trouble so as to be larger as the first degree becomes higher, and then outputs the two-dimensional code,
    wherein in addition to processing of changing the size of the two-dimensional code in accordance with the first degree, the controller changes a display color of the two-dimensional code in accordance with a predetermined second degree that uses an indicator different from the indicator used in the first degree.

3. The image forming apparatus according to claim 2, wherein the controller uses the second degree as a degree of danger in solving the trouble.

\* \* \* \* \*